United States Patent Office 3,507,749
Patented Apr. 21, 1970

3,507,749
PROCESS FOR PREPARING STEROIDS
Charles J. Sih, Madison, Wis., assignor to Wisconsin Alumni Research Foundation, Madison, Wis., a corporation of Wisconsin
No Drawing. Continuation-in-part of application Ser. No. 535,342, Mar. 18, 1966. This application Sept. 20, 1967, Ser. No. 669,303
Int. Cl. C07c 167/18
U.S. Cl. 195—51                    26 Claims

ABSTRACT OF THE DISCLOSURE

A process for producing steroid compounds from sterols of the cholestane series (e.g. cholesterol and β-sitosterol derivatives) which comprises altering the steroid nucleus of the sterols so that the altered nucleus is characterized by the presence of an oxygen-containing substituent attached to the 10- or 19-carbon atom or is the 19-desmethyl configuration, and then selectively cleaving the 17-side chain of such altered sterols microbiologically to produce compounds which can be readily converted by well known means to steroids useful as ovulation control agents. The 17-side chain cleavage can be accomplished with microorganisms of the genera Nocardia, Mycobacterium, Arthrobacter or Corynebacterium.

The invention described herein was made in the course of work under a grant or award from the Department of Health, Education, and Welfare.

This application is a continuation-in-part of copending United States applications Ser. Nos. 465,180, 465,204, and 465,205, all filed June 18, 1965; Ser. Nos. 483,302, 483,354 and 483,295, all filed Aug. 27, 1965; and Ser. No. 535,342, filed Mar. 18, 1966 (a continuation-in-part of the aforementioned six applications) all of which applications are now abandoned.

This invention relates to steroid hormones and more particularly to microbiological processes for converting readily available sterols into useful intermediates for the synthesis of hitherto more difficulty obtainable steroid hormones. More particularly, this invention relates to processes for selectively degrading naturally occurring sterols at the C-17 position, without concomitant ring cleavage, to obtain intermediates useful in synthesizing steroid hormones.

Still more particularly this invention is directed to methods for preparing, from readily available sterols such as cholesterol and β-sitosterol various key intermediates, such as estrone and 6,19-oxido-androst-4-ene-3,17-dione:

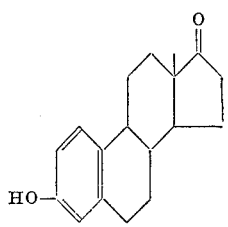

and

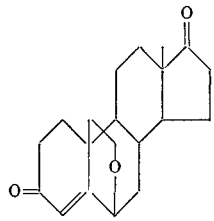

respectively, in the preparation of steroid hormones characterized by pronounced ovulation inhibition activity.

In recent years there has been great interest in various steroids and particularly the 19-norsteroids as prostagens for ovulation control. (G. Pincus, A. P. Merrill in C. A. Villee: Control of Ovulation. Pergamon Press, New York, 1961, p. 37). Consequently, much effort has been expended to find more economical routes to produce such compounds. (See for example, T. B. Windholz and M. Windholz. Angew, Chem. 76, 249, 1964.) Intermediates such as, for example, estrone and 6,19-oxido-androst-4-ene-3,17 dione, can be readily converted by well known methods to 19-norsteroids having utility as ovulation control agents. [See for example, J. A. Harkman et al., J. Am. Chem. Soc., 78, 5662 (1956), A L. Wilds and N. A. Nelson, J. Am. Chem. Soc, 75, 5366 (1953) and J. Kalvoda et al., Helv. Chim. Acta 46, 1361 (1963).]

Broadly the present invention comprises preventing the steroid nucleus of a sterol from cleaving in its ring structure during selective microbiological cleavage of the sterol side chain at the C-17 position. It has been found that this can be accomplished by altering the configuration of the sterol molecule at the 19-position prior to the microbiological fermentation to cleave the side chain. More specifically, it has now been found that alteration of the molecule of sterols of the cholestane series so that the nucleus is characterized by the presence of an oxygen containing substituent attached to the 10- or 19-carbon atom or is the 19-desmethyl configuration, will protect the steroid nucleus against cleavage, and particularly against cleavage at the 9–10 bond, when the thus altered sterol molecule is subjected to microbiological action to cleave the side chain. It has also been found that microorganisms which are capable of functioning to cleave the side chain of sterol molecules altered as indicated above are those which elaborate oxidizing enzymes. In particular, those microorganisms which have been conditioned through growth in a mineral salt solution utilizing a sterol as the sole carbon source have been found to be superior for purposes of this invention. Examples of such microorganism are those of the genera Nocardia, Mycobacterium, Arthorbacter and Corynebacterium. Specifically a microorganism of the Nocardia species and identified as ATCC 19170 has been found to be eminently suitable for the process of this invention.

The oxygen containing substituent attached to the 10- or 19-carbon atom may be hydroxy or may be one end of an oxido bridge as, for example a 6,19-oxido, or a 4,19-oxido, or a 2,19-oxido configuration. Also useful are 10-carboxyl 19-nor, 10-aldehydic 19-nor and similar 10-oxygenated 19-nor substituents. The 19-nor configuration (19-desmethyl) was also found to prevent the steroid nucleus from cleaving during microbiological cleavage of the side chain.

According to preferred embodiments of this invention materials of the cholestane series having at the 17-position a side chain consisting of an aliphatic saturated hydrocarbon radical containing from 8 to 10 carbon atoms and modified at the 19-position as described above, such as 19-nor cholestanol, 19-nor cholestenol, 19-nor cholest-enone, -dieneone or-trieneone or 19-oxy-substituted-cholestanol, -cholestenol, -cholestenone, -cholestdieneone and -cholest-trieneone can be subjected to fermentation procedures with micro-organisms of the aforementioned genera under submerged aerobic conditions in an aqueous fermentation medium to cleave the side chain. Highly useful intermediates for synthesis of ovulation control agents, such as estrone or 6,19-oxidoandrost-4-ene-3,17-dione, or their derivatives can be readily prepared by such procedures.

It is to be understood that the process of this invention is not to be considered as limited to the compounds specifically set forth herein but is also applicable to other sterols containing substituents in the 1-, 2-, and 4-position compounds having double bonds at one or more of the 4(5)-7(8), 4(5)-9(11), 4(5)-8(9), 4(5)-6(7), 4(5)-14(15), 4(5)-15(16) and 4(5)-8(14) positions are operable in the process of this invention. In like manner, sterols of the cholestane series containing substituent groups on the nucleus other than those hereinbefore specified may also be treated in accordance with this process. Thus, such sterols containing substituents in the 1-, 2-, and 4-positions where such substituents comprise ester, ether, enol-ether or enol-ester configurations, e.g. methoxy, hydroxy, ethoxy, etc., can be used. Sterols having various combinations of substituent groups as well as double bonds are also operable. In all cases, however, the steroid nucleus must be oxygenated at the 3-position and the substituent attached to the 10- or 19-carbon atom must contain an oxygen function or be the 19-desmethyl configuration if the nucleus is to be prevented from cleaving during the microbiological fermentation directed to cleaving of the 17-side chain.

Although there is no intention to be bound by the following theoretical considerations, it is believed that in the fermentation the microorganism functions to degrade the steroid compound by initially removing the side chain to yield a steroid with a shortened side chain which is then metabolized via the 9,10-seco pathway [R. M. Dodson and R. D. Muir, J. Am. Chem. Soc., 83, 4627 (1961)]. By blocking the introduction of an A-ring double bond through the formation of an oxido bridge or by interfering with the 9α-hydroxylation through the introduction of a hydroxyl or other oxy-function at C-19 the desired 17-keto intermediate, such as estrone, accumulates. Basically the process functionizes the 19-position in the steroid nucleus.

As mentioned hereinbefore, at the 17-position the sterol should have the cholestane type of side chain, that is, an aliphatic saturated chain consisting of from 8 to 10 carbons, making the total carbon content of the useful sterols from C-27 to C-29 (excluding the 19-nor derivatives). Among the more useful cholestanes are generally those having a double bond at the 5,6 nuclear position or at the 4,5-linkage. Examples of these are derivatives of cholestanol (5α-cholestan-3β-ol) and particularly cholesterol, campesterol, cerebrosterol and β-sitosterol.

Microorganisms which are characterized by their oxygenating activity are well known in the microbiological art. Reference is particularly made to U.S. Patents 2,602,769; 2,649,400; 2,649,401; 2,649,402; 2,658,023, and 2,905,592. Any of the genera of microorganisms described therein may be employed in the process of this invention. The steroid starting material may be incorporated in a nutrient medium of standard composition in which such organisms are cultivated and the usual conditions of fermentation may then be employed to effect the steroid conversion. Alternatively the active principle may be removed from the growing culture of microorganism, for instance by lysis of the cells to release the enzymes, or by suspension of the mycelium in a fresh aqueous system. In any of these techniques the 17-side chain of the sterol will be selectively cleaved without ring cleavage so long as the active oxygenating principle elaborated by the microorganism is present in the medium. Of course, the temperature, time and pressure conditions under which the contact of the cholestane derivative with the oxygenating principle is carried out are interdependent as will be apparent to any one skilled in this art. For instance, for gentle heating and atmospheric pressure the time required to effect the steroid conversion will be less than at room temperature under conditions otherwise the same. Of course, neither temperature nor pressure nor time should be so high that the sterol is thereby degraded. Where a growing culture of the organism is being used, the process conditions should also be sufficiently gentle so the organism is not killed prematurely before it elaborates sufficient oxidizing enzymes. Generally speaking, the temperature may range from about 10° C. to about 35° C., and the time from about 12 hours to about 10 days.

It has been found that the microorganism functions much more efficiently with substantially higher yields if it is initially conditioned by growth in a nutrient-mineral salts medium containing a sterol as the sole carbon source.

The following examples are given to illustrate this invention but not in any way to limit its scope.

EXAMPLE I (A) *Fermentation.*—Surface growth from a two week old agar slant of Nocardia sp-CSD-10 (ATCC 19170) grown on agar of the following composition:

| | Gms. |
|---|---|
| Agar | 20 |
| Glucose | 10 |
| Yeast extract | 2.5 |
| $K_2HPO_4$ | 1 |

Distilled water, q.s. 1 liter
(Sterilized 15 minutes at 20 p.s.i.)

was suspended in 5 ml. of an 0.85% saline solution. One ml. portions of this suspension were used to inoculate a 250 ml. Erlenmeyer flask (F1 stage) each containing 50 ml. of the following medium (Bushnell-Haas medium, J. Bacteriology, 41, 653, 1941):

| | G. |
|---|---|
| $M_gSO_4$ | 0.20 |
| $CaCl_2$ | 0.02 |
| $KH_2PO_4$ | 1.00 |
| $K_2HPO_4$ | 1.00 |
| $NH_4NO_3$ | 1.00 |
| $FeCl_3$ | 0.05 |
| Cholesterol | 0.30 |

Distilled water to 1000 ml.
pH adjusted to 7.0–7.2 with dilute NaOH.

The flasks were incubated at 25° C. on a rotary shaker (250 cycles/min.—2″ radius) for 24 hours, after which a 10% by volume transfer was made to each of twelve 2 liter Erlenmeyer flasks (F2 stage) each containing 400 ml. of the following medium (Difco nutrient broth):

| | Gms. |
|---|---|
| Bacto-beef extract | 3 |
| Bacto-peptone | 5 |

Distilled water, q.s. 1 liter.
pH 6–8 (sterilized for 15 minutes at 30 p.s.i.)

Simultaneously, 120 mg. of 19-hydroxycholesterol acetate was added to each flask by the addition of 5 ml./flask of a solution containing 120 mg. of 19-hydroxycholesterol acetate in N,N-dimethylformamide, resulting in a final 19-hydroxycholesterol acetate concentration of 0.03%. The F2 stage flasks were then incubated for an additional 96 hours under the conditions used in the incubation of the F1 stage flasks.

(B) *Isolation.*—96 hours after the addition of the steroid substrate, 200 ml. of chloroform were added to the fermented broth in each flask. The flasks were then placed on a rotary shaker as described above and extracted for 15 minutes at 25° C.

The chloroform (2400 ml.) was separated from the total fermentation broth (4800 ml.) and the broth was re-extracted with 2400 ml. and 1200 ml. portions of chloroform. The combined extracts were washed twice with 3000 ml. portions of water and evaporated to dryness, in vacuo. The residue 0.96 g. was fractionally crystallized from acetone-petroleum ether (B.P. 40–70° C.) to give 416 mg. of estrone, M.P. 258–260°

$\lambda_{max}^{alc.}$ 280 m$\mu$ (2,200)

EXAMPLE 2

Estrone was prepared in accordance with the procedure of Example 1 except that *Mycobacterium fortuitum* (Dr. R. Kallio collection, Department of Microbiology, University of Iowa, Iowa City, Iowa) was used as the microorganism to effect the conversion to estrone.

EXAMPLE 3

Estrone was prepared in accordance with the procedure of Example 1 except that *Nocardia corallina* (Dr. R. Kallio collection, Department of Microbiology, University of Iowa, Iowa City, Iowa) was used as the microorganism to effect the conversion to estrone.

EXAMPLE 4

Estrone was prepared in accordance with the procedure of Example 1 except that *Norcardia opaca* (Dr. K. Kallio collection, Department of Microbiology, University of Iowa, Iowa City, Iowa) was used as the microorganism to effect the conversion to estrone.

EXAMPLE 5

Estrone was prepared in accordance with the procedure of Example 1 except that *Arthrobacter simplex* (ATCC 6946) was used as the microorganism to effect the conversion to estrone.

EXAMPLE 6

Estrone was prepared in accordance with the procedure of Example 1 except that Corynebacterium sp. (ATCC 14887) was used as the microorganism to effect the conversion to estrone.

EXAMPLE 7

Estrone was prepared in accordance with the procedure of Example 1 except that *Mycobacterium phlei* was used as the microorganism to effect the conversion.

EXAMPLE 8

Estrone was prepared in accordance with the procedure of Example 1 except that *Mycobacterium smegmatis* was used as the microorganism to effect the conversion.

EXAMPLE 9

Estrone was prepared in accordance with the procedure of Example 1 except that *Corynebacterium equi* was used as the microorganism to effect the conversion.

EXAMPLE 10

The procedure of Example 1 was again employed, this time substituting for the steroid reactant an identical quantity of 10-carboxy-cholest-4-en-3-one. 210 mg. of estrone was obtained.

When the procedure of this example was repeated with the microorganisms *Mycobacterium fortuitum*, *Arthrobacter simplex* and Corynebacterium sp. (ATCC 14887) the same conversion to estrone was again achieved.

Also, substitution of 10-carboxysitost-4-en-3-one for 10-carboxy-cholest-4-ene-3-one in the process of this example yielded estrone in comparable amounts.

EXAMPLE 11

Conversion to estrone is achieved where the procedures of Example 1 and Example 10 are followed but where the microorganisms used for the conversion are respectively *Arthrobacter tumescens* (ATCC 6947), *Arthrobacter terregens* (ATCC 13345), and *Corynebacterium specdonicum*.

EXAMPLE 12

The procedure of Example 1 was again employed, this time substituting for the steroid reactant an identical quantity of 19-norcholest-4-en-3-one. 468 mg. of estrone was obtained.

Repetition of the procedure of this example employing as the microorganisms *Mycobacterium fortuitum*, *Nocardia erythropolis*, *Arthrobacter simplex*, and Corynebacterium sp. resulted in the same conversion to estrone. Also, substitution of 19-norsitost-4-en-3-one in the process of this example yielded estrone in comparable amounts.

EXAMPLE 13

The procedure of Example 1 was again followed using as the steroid reactant 10-formyl, 19-nor-cholest-4-en-3-one in identical amount. 325 mg. of estrone was obtained.

When the procedure of this example was repeated employing the microorganisms *Mycobacterium fortuitum*, Corynebacterium sp., and *Arthrobacter simplex*, the same conversion was achieved.

If desired 10-formyl, 19-nor-sitost-4-en-3-one can be substituted as the steroid reactant for 10-formyl, 19-nor-cholest-4-en-3-one with equivalent results.

EXAMPLE 14

The procedure of Example 1 was again followed using as the steroid reactant, 19-hydroxy-β-sitosterol acetate in identical amount 158 mg. of estrone was obtained.

When the procedure of this example was repeated employing the microorganisms *Corynebacterium equi*, Corynebacterium sp. (ATCC 14887), *Mycobacterium fortutium*, *Mycobacterium phlei*, *Mycobacterium smegmatis*, *Nocardia erythropolis*, and *Arthrobacter simplex*, the same conversion was achieved.

By terminating the fermentation after 48 hours instead of 96 hours, subsequent to the addition of the 19-oxygenated sterols, it was possible to recover the following bis-norcholanic acid derivatives and 19-hydroxy-androst-4-ene-3,17-dione (IV).

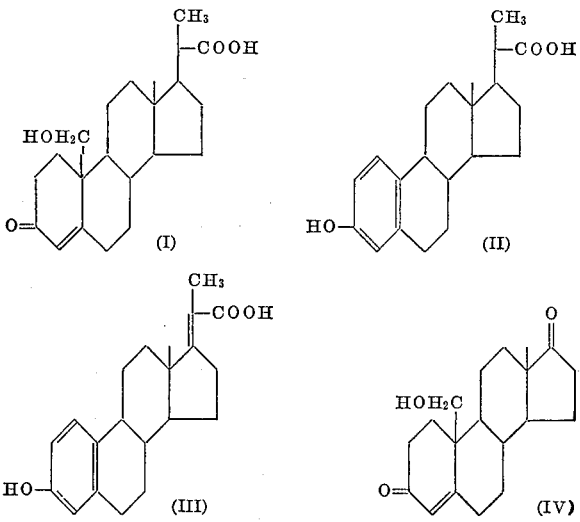

EXAMPLE 15

The procedure of Example 1 was followed except that Corynebacterium sp. (ATCC 14887) was used as the microorganism to effect the conversion of 19-hydroxy-cholest-4-en-3-one or 19-hydroxycholesterol acetate. The yield comprised 30 mg. of 19-hydroxy-3-ketobisnor-4-cholen-22-oic acid (I); 115 mg. of 3-hydroxybisnorchola-1,3,5(10)-trien-22-oic acid (II); 24 mg. of 3-hydroxybisnorchola-1,3,5(10), 17(20)-tetraen-22-oic acid (III), and 48 mg. of 19-hydroxyandrost-4-ene-3,17-dione (IV).

When this procedure was again repeated with the microorganisms Nocardia sp. CSD–10 (ATCC 19170), *Nocardia erythropolis*, *Arthrobacter simplex* and *Mycobacterium fortuitum*, identical products were obtained in comparable yields.

Substitution of 19-hydroxysitosterol acetate or 19-hydroxysitost-4-en-3-one, for the steroid reactant in the procedure of this example gave comparable yields of identical products.

EXAMPLE 16

6,19-oxidoandrost-4-ene-3,17-dione was prepared as follows:

(A) *Fermentation.*—Surface growth from a two week old agar slant of Nocardia sp CSD-10 (ATCC 19170), grown on agar of the following composition:

| | Gms. |
|---|---|
| Agar | 20 |
| Glucose | 10 |
| Yeast extract | 2.5 |
| $K_2HPO_4$ | 1.0 |

Distilled water, q.s. 1 liter.
(Sterilized 15 minutes at 20 p.s.i.).

was suspended in 5 ml. of an 0.85% saline solution. One ml. portions of this suspension were used to inoculate a 250 ml. Erlenmeyer flask (F1 stage) each containing 50 ml. of the following medium (Bushnell-Haas medium, J. Bacteriology, 41, 653, 1941):

| | Gms. |
|---|---|
| $M_gSO_4$ | 0.2 |
| $CaCl_2$ | 0.02 |
| $KH_2PO_4$ | 1.0 |
| $K_2HPO_4$ | 1.0 |
| $NH_4NO_3$ | 1.0 |
| $FeCl_3$ | 0.05 |
| Cholesterol | 0.3 |

Distilled $H_2O$ to 1000 ml.; adjust pH to 7.0–7.2 with dilute NaOH.

The flasks were incubated at 25° C. on a rotary shaker (250 cycles/min.—2″ radius) for 24 hours, after which a 10% by volume transfer was made to each of ten 2 liter Erlenmeyer flasks (F2 stage). Each contained 200 ml. of the following medium (Difco nutrient broth):

| | Gms. |
|---|---|
| Bacto-beef extract | 3 |
| Bacto-peptone | 5 |

Distilled water, q.s. 1 liter.
pH 6.8 (sterilized for 15 minutes at 30 p.s.i.)

Simultaneously, 120 mg. of 3β-acetoxy-5α-chloro-6,19-oxidositostane was added to each flask by the addition of 5 ml./flask of a solution containing 120 mg. of 3β-acetoxy-5α-chloro-6,19-oxidositostane in N,N-dimethylformamide, resulting in a final steroid concentration of 0.03%. The F2 stage flasks were then incubated for an additional 96 hours under the conditions used in the incubation of the F1 stage flasks.

(B) *Isolation.*—96 hours after the addition of the steroid substrate, 200 ml. of chloroform was added to the fermented broth in each flask. The flasks were then placed on a rotary shaker as described above and extracted for 15 minutes at 25° C.

The chloroform (2000 ml.) was separated from the total fermentation broth (4000 ml.) and the broth re-extracted with 2000 ml. and 1500 ml. portions of chloroform. The combined extracts were washed with 3000 ml. portions of water twice and evaporated to dryness in vacuo. The residue, 2.1 g., was fractionally crystallized from acetone-petroleum ether (B.P. 40–70° C.) to give 129 mg. of 6,19 - oxido - androst-4-ene-3,17-dione, M.P. 180–182°; $[\alpha]_D^{25} - 36°$.

EXAMPLE 17

The procedure of Example 16 was employed, substituting for the steroid reactant an identical quantity of 3β-acetoxy - 5α - chloro - 6,19-oxido-chloestane. The desired product was obtained in a yield of 258 mg. after recrystallization.

When this procedure was repeated employing the microorganisms Corynebacterium sp, Mycobacterium fortuitum, and Arthrobacter simplex the same conversion was again achieved.

EXAMPLE 18

The procedure of Example 16 was carried out again, this time starting with 6,19-oxidocholest-4-en-3-one as the steroid reactant. 408 mg. of the desired final product was recovered.

The same product was again obtained in comparable yield when the process was performed with 6,19-oxidositost-4-en-3-one as the steroid reactant.

Repetition of these procedures employing the microorganisms Corynebacterium sp, *Corynebacterium equi, Mycobacterium fortuitum, Mycobacterium phlei, Mycobacterium smegmatis, Arthrobacter simplex,* and *Nocardia erythropolis,* gave the desired product in comparable yield.

By shortening the fermentation period—e.g. to 48 hours, it is possible to accumulate bisnorcholenic acid derivatives of the following general formula:

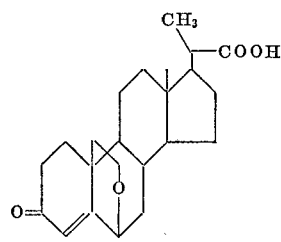

EXAMPLE 19

The procedure of Example 16 was again followed except that *Nocardia erythropolis* was used as the microorganism to effect the conversion. 115 mg. of 6,19-oxido-3-ketobisnorchol-4-en-22-oic acid was obtained.

When this procedure was again repeated employing the microorganisms Corynebacterium sp, *Arthrobacter simplex* and *Mycobacterium fortuitum,* the same conversion was achieved.

Utilization of 6,19-oxido-cholest-4-en-3-one, 6,19-oxidositost-4 - en - 3-one and 3β-acetoxy-5α-chloro-6,19-oxidocholestane, as the steroid reactant in the procedure of this example gave the identical product in comparable yield.

EXAMPLE 20

Following the procedure of Example 16, conversion to the desired 6,19 - oxido-androst-4-ene-3,17-dione is obtained when the microorganisms *Arthrobacter tumescens* (ATCC 694), *Arthrobacter terregens* (ATCC 13345), and *Corynebacterium specdonicum* are used instead of the Nocardia.

EXAMPLE 21

The procedure of Example 16 was followed substituting for the steroid reactant an identical quantity of 2,4 - dimethoxy - 6,19-oxidocholesta-1,4-diene-3-one. The desired product, 2,4 - dimethoxy - 6,19-oxidoandrosta-1,4-diene-3,17-dione, was obtained.

When this procedure was repeated with the microorganism *Mycobacterium fortuitum, Arthrobacter simplex* and Corynebacterium sp instead of the Nocardia the identical product was obtained.

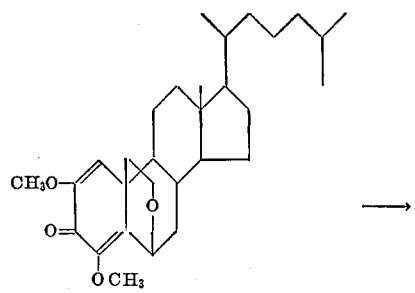

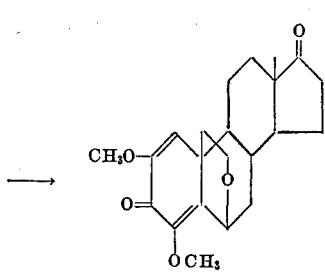

What is claimed is:

1. The process for preparing bisnorcholanic acid derivatives which comprises cultivating a microorganism of the genus Nocardia, Mycrobacterium, Arthrobacter or Corynebacterium in an aqueous nutrient medium under submerged aerobic conditions in the presence of a sterol selected from the group consisting of compounds having the formulae

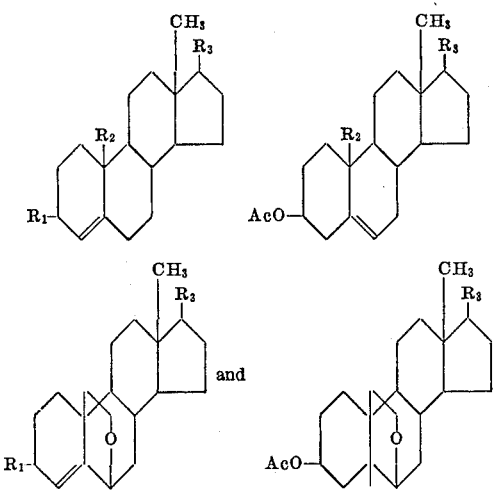

where $R_1$ is keto or acetoxy, $R_2$ is methylenehydroxy and $R_3$ is a saturated aliphatic hydrocarbon radical having eight or ten carbon atoms, and recovering the bisnorcholanic acid derivatives from the fermentation medium.

2. The process of claim 1 wherein the said sterol is 19-hydroxycholest-4-en-3-one and 19-hydroxy-3-ketobisnor-4-cholen-22-oic acid is recovered from the fermentation medium.

3. The process of claim 1 wherein the said sterol is 19-hydroxycholest-4-en-3-one and 3-hydroxybisnorchola-1,3,5(10)-trien-22-oic acid is recovered from the fermentation medium.

4. The process of claim 1 wherein the said sterol is 19-hydroxycholest-4-en-3-one and 3-hydroxybisnorchola-1,3,5(10),17(20)-tetraen-22-oic acid is recovered from the fermentation medium.

5. The process of claim 1 wherein the said sterol is 19-hydroxysitost-4-en-3-one and 19-hydroxy-3-ketobisnor-4-cholen-22-oic acid is recovered from the fermentation medium.

6. The process of claim 1 wherein the said sterol is 19-hydroxysitost-4-en-3-one and 3-hydroxybisnorchola-1,3,5(10)-trien-22-oic acid is recovered from the fermentation medium.

7. The process of claim 1 wherein the said sterol is 19-hydroxysitost-4-en-one and 3-hydroxybisnorchola-1,3,5(10),17(20)-tetraen-22-oic acid is recovered from the fermentation medium.

8. The process of claim 1 wherein the said sterol is 19-hydroxycholesterol acetate and 19-hydroxy-3-ketobisnor-4-cholen-22-oic acid is resovered from the fermentation medium.

9. The process of claim 1 wherein the said sterol is 19-hydroxycholesterol acetate and 3-hydroxybisnorchola-1,3,5(10)-trien-22-oic acid is recovered from the fermentation medium.

10. The process of claim 1 wherein the said sterol is 19-hydroxycholesterol acetate and 3-hydroxybisnorchola-1,3,5(10),17(20)-tetraen-22-oic acid is recovered from the fermentation medium.

11. The process of claim 1 wherein the said sterol is 19-hydroxysitosterol acetate and 19-hydroxy-3-ketobisnor-4-cholen-22-oic acid is recovered from the fermentation medium.

12. The process of claim 1 wherein the said sterol is 19-hydroxysitosterol acetate and 3-hydroxybisnorchola-1,3,5(10)-trien-22-oic acid is recovered from the fermentation medium.

13. The process of claim 1 wherein the said sterol is 19-hydroxysitosterol acetate and 3-hydroxybisnorchlor-1,3,5(10),17(20)-tetraen-22-oic acid is recovered from the fermentation medium.

14. The process of claim 1 wherein the said sterol is 6,19-oxidocholest-4-en-3-one and 6,19-oxido-3-ketobisnorchol-4-en-22-oic acid is recovered from the fermentation medium.

15. The process of claim 1 wherein the said sterol is 6,19-oxidositost-4-en-3-one and 6,19-oxido-3-keto-bisnorchol-4-en-22-oic acid is recovered from the fermentation medium.

16. The process of claim 1 wherein the said sterol is $3\beta$-acetoxy-$5\alpha$-chloro-6,19-oxidocholestane and 6,19 - oxido-3-ketobisnorchol-4-en-22-oic acid is recovered from the fermentation medium.

17. The process for preparing 19-hydroxyandrost-4-ene-3,17-dione which comprises cultivating a microorganism of the genus Nocardia, Mycobacterium, Arthrobacter or Corynebacterium in an aqueous nutrient medium under submerged aerobic conditions in the presence of a sterol having the formula

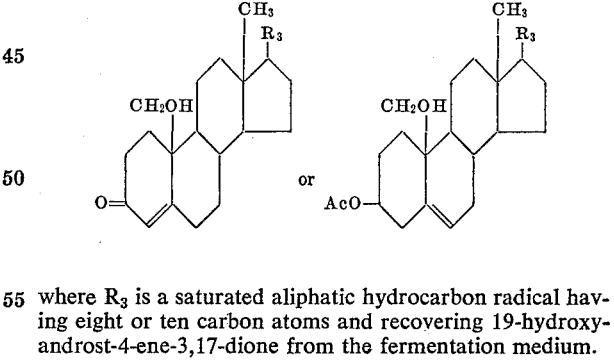

where $R_3$ is a saturated aliphatic hydrocarbon radical having eight or ten carbon atoms and recovering 19-hydroxyandrost-4-ene-3,17-dione from the fermentation medium.

18. The process of claim 17 wherein the said sterol is 19-hydroxycholest-4-en-3-one and 19-hydroxyandrost-4-ene-3,17-dione is recovered from the fermentation medium.

19. The process of claim 17 wherein the said sterol is 19-hydroxysitost-4-en-3-one and 19-hydroxyandrost-4-ene-3,17-dione is recovered from the fermentation medium.

20. The process of claim 17 wherein the said sterol is 19-hydroxycholesterol acetate and 19-hydroxyandrost-4-ene-3,17-dione is recovered from the fermentation medium.

21. The process of claim 17 wherein the said sterol is 19-hydroxysitosterol acetate and 19-hydroxyandrost-4-ene-3,17-dione is recovered from the fermentation medium.

22. The process for preparing estrone which comprises cultivating a microorganism of the genus Nocardia, Mycobacterium, Arthrobacter or Corynebacterium in an aqueous nutrient medium under submerged aerobic conditions in the presence of a sterol having the formula

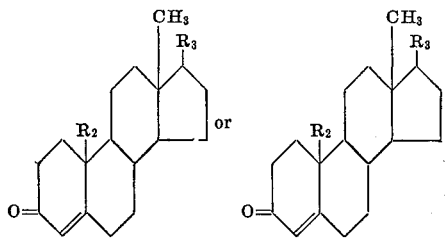

where $R_2$ is formyl or carboxy and $R_3$ is a saturated aliphatic hydrocarbon radical having eight or ten carbon atoms and recovering estrone from the fermentation medium.

23. The process of claim 22 wherein the said 10-formyl, 19-nor-sterol is cholest 4-en-3-one and estrone is recovered from the fermentation medium.

24. The process of claim 22 wherein the said sterol is 10-formyl, 19-nor-sitost-4-en-3-one and estrone is recovered from the fermentation medium.

25. The process of claim 22 wherein the said sterol is 10-carboxy, 19-nor-cholest-4-en-3-one and estrone is recovered from the fermentation medium.

26. The process of claim 22 wherein the said sterol is 10-carboxy, 19-nor-sitost-4-en-3-one and estrone is recovered from the fermentation medium.

References Cited

UNITED STATES PATENTS

| | | |
|---|---|---|
| 2,904,472 | 9/1959 | Wettstein et al. |
| 3,023,229 | 2/1962 | Muir et al. |
| 3,162,655 | 12/1964 | Bagli. |
| 3,395,078 | 7/1968 | Vezina et al. |
| 3,398,054 | 11/1965 | Vezina et al. |

ALVIN E. TANENHOLTZ, Primary Examiner